Oct. 6, 1959
PAUL DE PHILLIPS
ALSO KNOWN AS
PAUL DE FILLIPS
2,907,593
UNPACKED BALL AND SOCKET WITH SPRING-BIASED BALL
Filed Jan. 28, 1954
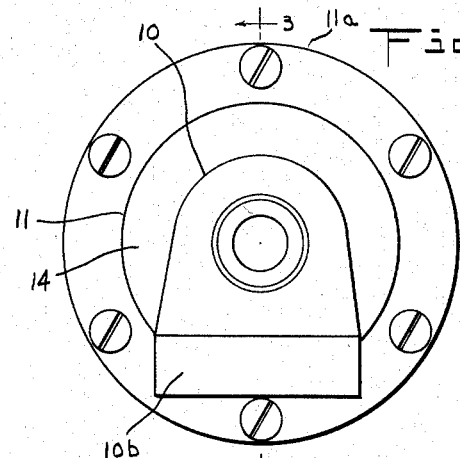
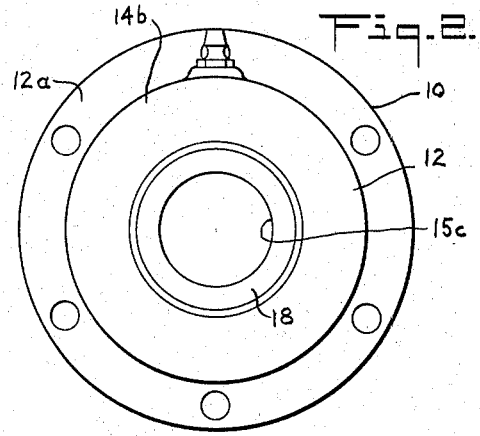
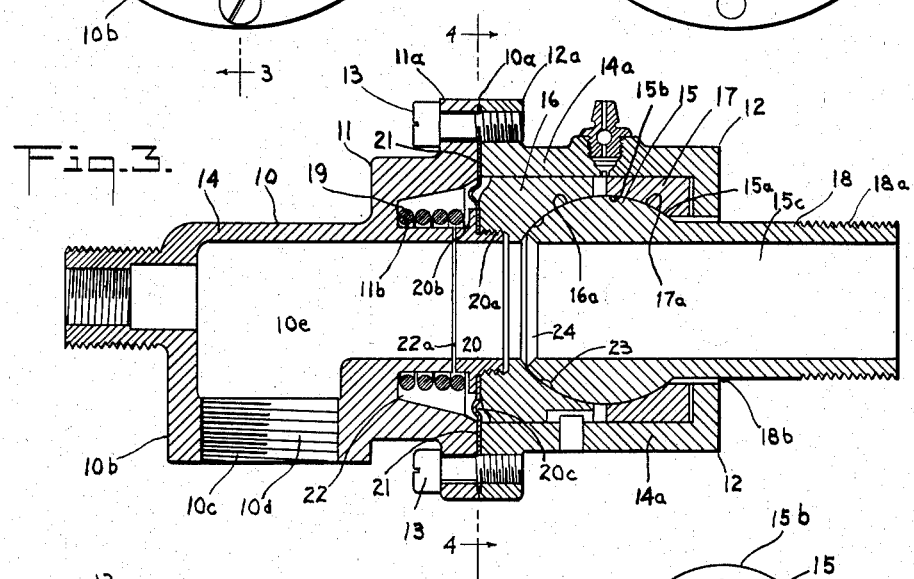
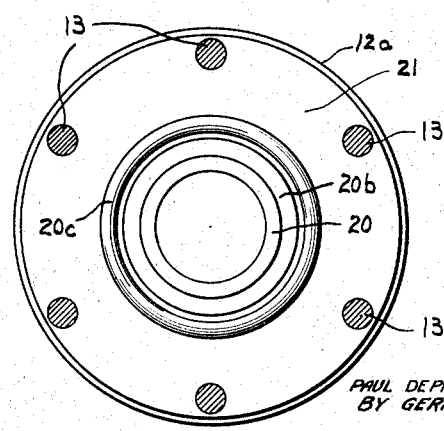
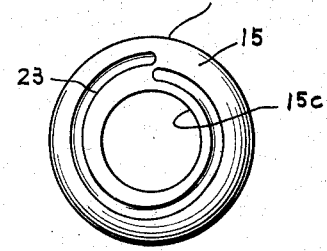
INVENTOR
PAUL DE PHILLIPS ALSO KNOWN AS PAUL DE FILLIPS, DECEASED,
BY GERARD DE PHILLIPS
BY Joseph F. O'Brien
ATTORNEY

United States Patent Office 2,907,593
Patented Oct. 6, 1959

2,907,593

UNPACKED BALL AND SOCKET WITH SPRING-BIASED BALL

Paul De Phillips, also known as Paul De Fillips, deceased, late of Fairview, N.J., by Gerard De Phillips, executor, Fairview, N.J., assignor to Richard H. Jenkins, Washington, D.C.

Application January 28, 1954, Serial No. 406,808

1 Claim. (Cl. 285—269)

This invention relates to improvements in rotary pressure-resisting joints and has special reference to packless leak-proof and flexible rotary pressure-resisting joints of the ball-joint type that may be used for various types of fluids.

One of the objects of this invention is to produce a rotary pressure-resisting joint of the ball-joint type that will be packless and leak-proof and that may be employed in steam, water, oil, chemicals or gas and Dowtherm cooling or heating systems, and will also be capable of use where speed of rotation of the moving parts and high temperature are required.

Another object of my invention is to produce a joint of the type specified that will be formed with an all metal seating of substantially the entire convex spherical surface of the ball-joint part to provide a maximum area of sealing surface and positive sealing of the movable ball-joint parts combined with a very high degree of durability or long wear and which will reduce to a minimum the operating costs of systems for transferring steam, liquids and other materials into and from revolving drums or rollers, increase the operating efficiency thereof and eliminate substantially all the maintenance costs.

Another object of my invention is to provide a two part housing construction in which one part or section of the housing, and preferably the outlet part, completely embodies and encloses a hard metal convex spherical part together with bronze inserts having concave seating surfaces for said convex spherical part and the other housing part or section embodies and encloses a spring for pressing the concave surfaces of the inserts into close though resilient contact, and a long wearing metallic diaphragm is provided between said housing parts which abuts the outer end of said inserts within the outlet housing part to provide a leakproof seal of the space between the inlet and outlet housing parts, thus preventing passage of any sediment in the materials being transferred and protecting the joint between the inserts and the outlet housing part.

Another object of this invention is to provide for an angular or swinging movement of the spherical portion of the joint in relation to the longitudinal axis of its seat and to avoid the usual rapid wear and maintenance costs caused by compensating for any misalignment of the moving parts, and also to avoid the constant repacking of stuffing boxes usually required in prior art ball-joints.

Another object of this invention is, because of the leak-proof properties of my joint, to eliminate any possibility of scalding or other burns to an operator while liquid or steam is being transferred in a hot state.

Another object of this invention is in a pressure-resisting joint of the ball-joint type specified to enable the employment of a long-wearing housing of a high density metallic alloy and a long-wearing ball member preferably composed of steel alloy, in combination with bearing inserts preferably composed of bronze and having surfaces on such inserts as well as on the bearing surface of the steel-alloy ball portions per se that are precision-lapped to insure a perfect seal between said moving parts.

Another object of this invention is to provide, in combination with the other construction features hereinafter specified, an additional leak-proof factor whereby any possible seepage between the concave sealing surfaces of the inserts and the spherical surface of the ball member will be repelled and repulsed, and for this purpose I provide in the spherical surface of the rotating ball member a spiral groove which acts as a pump in repulsing any possible seepage between the sealing surfaces.

Another object of this invention is in a device of the character specified to provide a plenum chamber, to extend said metallic diaphragm thereacross with a leak-resisting bearing on a terminal end of a metallic insert and to provide fastening means for said diaphragm comprising a peripheral securing connection between housing portions to completely enclose said inserts in the outlet section thereof and an intermediate connection surrounding the fluid passage and positioned between the flanges of a lock nut and the end of said inserts.

Another object of this invention is in a joint of the type specified to provide a groove or crimp in the metallic diaphragm to produce the necessary flexibility of the metal thereof to function as a joint-sealing element.

Still another object of this invention is in a device of the character specified to utilize a strong spring for the purpose of pressing the inserts and the concave bearing surfaces thereof against the convex spherical surface of the spherical part or member, and preferably to position said spring to abut against the lock nut that has a fast screw connection with one of such inserts.

Another object of this invention is to utilize a plenum chamber between the diaphragm and the fluid passage in the inlet housing part which will cause liquids, gases, oils or other substances entering the housing to produce an equal pressure against the diaphragm and lock nut which is fastened to the upper joint of the sealing insert, thus creating an equalized pressure on the bearing surfaces of the ball-joint parts and forming a more effective seal to prevent leakage through such bearing surfaces of the ball part and both the concave inserts. A seal is thus produced between the ball portion and the concave surfaces of the inserts that is variable and increases in accordance with the pressure passing through the fluid passage, thus effectually preventing any possible leakage of liquids, gases and other materials between the spherical and abutting surfaces as hereinabove specified.

Another object of this invention is to provide a construction in which the seal between the parts becomes more positive as the joint revolves because the use of the diaphragm excludes any sediment or abrasive particles which might enter the joint between the revolving part and its seat.

Another object of this invention is to provide a flexible joint construction in which it is not necessary for the spherical revolving part to be truly concentric with the part in which it revolves, as the said ball portion will revolve on its axis in varying eccentric positions, and consequently this flexible movement of the ball or spheroid within the inserts will eliminate the necessity common in prior art structures of a flexible hose as a connection between the rotary pressure-resisting joint and transfer lines, and allows the user to make a permanent installation of the said rotary joint with rigidly-positioned pipes and the like.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:

Fig. 1 is an end elevation of the inlet portion of a joint embodying my invention;

Fig. 2 is an end elevation of the opposite end of the valve;

Fig. 3 is a section through the axis of the joint substantially on the line 3—3 of Fig. 1;

Fig. 4 is a section on the line 4—4 of Fig. 3 looking in the direction of the arrows; and Fig. 5 is a view in end elevation of the spherical member of the joint removed from the housing and showing the position of the spiral groove in the spherical surface thereof.

Referring now to these drawings which illustrate a preferred embodiment of my invention, it will be understood that the device shown comprises a rotary joint which is particularly adapted for use at the inlet end of a roller, revolving drum or the like (not shown) and that a similar rotary joint may be used at the opposite side of such roller, drum or the like.

As illustrated, the rotary joint comprises a two-part rigid housing 10 composed of an inlet housing part 11 having a connecting flange 11$^a$ and an outlet housing part 12 having a matching connecting flange 12$^a$, and these flanges are, as shown, connected together by bolts 13. The housing 10 has two interconnected sockets 14—14$^a$ divided at the joining line 10$^a$ of the flanges 11$^a$ and 12$^a$. The inlet housing part or section 11, as shown, is provided with an inlet elbow 10$^b$ having an inlet bore 10$^c$ provided with a screw-thread 10$^d$ and communicating with the axial fluid passage 10$^e$, and a cylindrical socket 14$^a$ of the housing part 12 has fitted therein both outer and inner inserts 16 and 17, respectively, having cylindrical outer surfaces and slidably fitted within the cylindrical socket 14$^a$ of the housing section 12. Each of said inserts has a concave inner bearing surface, and these concave bearing surfaces 16$^a$, 17$^a$ are carefully fitted to and have a combined area substantially similar to the convex ball or spherical portion 15$^b$ and conjointly surround and have a bearing contact with the entire spherical portion 15$^b$ of a ball or spheroid part 15 of the ball-joint member 15$^a$, all within the outlet part 12 of the housing 10. This ball-joint member 15$^a$ has the usual fluid-passing bore or passage 15$^c$ and is provided with an integral nipple or pipe-connecting portion 18 having a thread 18$^a$ which may be suitably connected to a rigid transfer pipe or the like (not shown).

The ball-shaped bearing surface 15$^b$ of the member 15 is positioned and carefully fitted within the concave contact surfaces 16$^a$ and 17$^a$ of the outer and inner inserts 16 and 17, and said inserts are resiliently pressed by spring 19 into and toward the bottom of the socket of the housing part 12 and against the ball surface 15$^b$. The concave surfaces 16$^a$ and 17$^a$ of the inserts are thus resiliently pressed or forced into close contact with the spherical surface 15$^b$ by means of said spring 19. As shown, the spring 19 exerts pressure against a lock nut 20 having a screw threaded connection at 20$^a$ with the outer insert 16. The spring 19 abuts at one end against the internal housing portion 11$^b$ and at the opposite end engages a flange 20$^b$ of the said lock nut 20. The outer insert 16 is, as aforesaid, completely enclosed in the housing part 12 but has its outer-end surface extending into substantial alignment with the connecting line 10$^a$ of the housing parts 11 and 12.

In order to produce a leak-proof joint between the concave surfaces of the inserts and the convex surfaces 14$^a$ of the ball portion 15, applicant preferably mounts a diaphragm 21 between the lock-nut flange 20$^b$ and said outer-end surface of the insert 16. Said diaphragm is provided with a central orifice or passage, the edge of which is connected between the flange of the lock nut and the outer surface of the outer insert and is extended to the perimeter of the housing flanges 11 and 12 and inserted between said flanges of the housing parts 11 and 12. As illustrated the diaphragm 21 is provided with suitable bolt-holes to permit tight engagement and connection of its perimeter with the flanges 11$^a$ and 12$^a$ of the housing and a similar tight engagement is made at the connection thereof between the lock-nut and insert.

In the preferred embodiment of my invention this diaphragm 21 is formed of durable metal and is made flexible by the provision within the body of the diaphragm of a concentric crimp or groove 20$^c$. Such flexibility provides a durable metallic diaphragm for the purpose of procuring desired flexibility in a leak-proof joint and eliminates the use of usual rubber gaskets and the like.

Also in the preferred embodiment of my invention the inlet housing part 11 is provided with a plenum chamber 22 which communicates with the inlet chamber 10$^e$ through a pressure-distributing opening 22$^a$ between the housing member 11 and the lock-nut 20. This opening 22$^a$ allows any pressure fluid to enter the fluid passage of the housing portion of the device and be distributed to the enlarged plenum chamber 22. Such pressure within the plenum chamber 22 will thus force the diaphragm 21 into tight engagement with the outer surface of the insert 16, and this resilient pressure on the outer surface of the outer insert will provide desirable resilience in transmitting the pressure of the spring to the concave surface 16$^a$ of said insert and said insert will be resiliently forced inwardly and the concave surface thereof will have a resilient bearing contact against the convex spherical surface 17$^a$ of the member 15$^a$.

It will be noted that the nipple member 18$^a$ is fitted loosely within a bore 18$^b$ of the housing part 12 so as to provide flexibility or a limited swinging of the member 15$^a$ within the housing 12 and thus to enable connection directly to the proper pipe of a system in which the joint is used and thus eliminate the use in such system of the flexible hose heretofore provided in many ball-joint installations.

In the preferred embodiment of my invention shown, I also preferably provide a fluid-expelling groove 23 in the spherical surface of the member 15$^b$. This groove 23 is positioned adjacent to the nose or inlet 24 of the member 15, and it will be understood that during the rotating of the spherical surface 15$^b$ the groove will expel any liquid or fluid that may possibly leak through the diaphragm and joint hereinabove specified. Said groove is of helical or spiral conformation having its spiral advancing in a direction opposite to the direction of movement of the spherical or concave surface in which it is formed. Said spiral groove also preferably extends in a direction opposite to the advancing screw-threads 18$^a$ of the nipple section 18 which are utilized to connect the connecting joint member 15$^a$ into any system in which a leak-proof ball-joint is required or desired.

It will be seen that upon the turning of the spherical surface of the connecting joint member 15$^a$ in one direction within the continuous concave matching surfaces 16$^a$—17$^a$ of the insert members, as for example in a clockwise direction, said spiral groove will resist and expel or force outwardly or backwardly toward the fluid entrance end 24 of the connecting joint member 15$^a$ any fluid that may possibly seep through the joint between said spheroidal and concave matching surfaces, and an additional effective seal against the entrance beyond said groove of fluid under pressure between such concave and convex surfaces is thus provided.

Having described my invention, I claim:

A rotary high pressure resisting packless pipe joint of the rotary ball and socket type embodying, in combination, a ball joint pipe member having a fluid passing cylindrical bore and provided with an integral convex portion having a spherical surface, a housing comprising forward and rear parts, each having a fluid passing section, the rear end of said housing being provided with a circular bore of a larger size than the surface portion of the ball joint pipe member to provide flexibility between the ball housing parts and enable connection of the ball joints directly into a rigid part of a pipe system without the insertion of said system of a flexible hose connection or the like, flanges on each of said housing parts for connecting the ends of two parts of said housing together and providing an inter-connected fluid passage therethrough, said forward part including an outer annular flange concentric with the fluid passing section and of the same internal diameter and forming an annular recess in said forward part, said spherical member having a spiral axis encircling groove having its spiral advancing in a direction toward the fluid passing junction of the housing parts whereby upon the rotating of said spherical surface said spiral groove will resist seepage and positively return toward the fluid passing joint between the ball joint member and the inserts any fluid that may seep between said bearing surfaces, a pair of one piece annular bearing inserts fitting and lining the internal wall of one said parts to produce a close metal to metal joint therebetween, each insert having a metallic bronze concave bearing surface closely fitting the said spherical surface of said convex ball portion and having a closely engaged and non-packed metallic bearing contact surface surrounding the spherical surface of said convex portion of the ball joint member, said inserts being composed of two annular parts together forming a substantially continuous concave bearing surface and comprising an inner insert contacting with the substantially entire rear portion of the spherical surface of the ball member, the inner of said inserts completely covering said spiral groove and a forward insert contacting with the substantially entire forward portion of the spherical surface of the ball joint member and extending forwardly of said spherical surface, the parts being arranged to cause the fluid passage of the ball joint member to communicate with the fluid passage in the opposite housing part, means for preventing seepage of fluid between said metal to metal joint to cause the same to be leakproof comprising a diaphragm of durable metal extending across the joint between said inserts and said housing, said diaphragm having a central fluid passing open aligned with the bore of the ball joint member and having a fluid tight joint at the outer perimetric edge thereof between said housing flanges, and also having a second fluid tight joint at the edge of its central opening with said inserts, said metallic diaphragm being bent to form a groove concentric to the axis thereof and the annular surface thereof between said fluid tight joints to produce such flexibility of the metal of the diaphragm as to enable the metallic diaphragm to function as a joint sealing element, a lock nut having an external peripheral flange thereon and an external threaded portion threadedly engaging the interior of said inserts about the central opening thereof, and a heavy duty compression coil spring seating in said annular recess in said forward housing part bearing against said peripheral flange of said lock nut to resiliently press the concaved surfaces of the inserts into said metallic bearing contact surface in closely engaged in non-packed bearing engagement with the spherical surface of the ball joint member.

References Cited in the file of this patent

UNITED STATES PATENTS

| | | |
|---|---|---|
| Re. 23,298 | Monroe | Nov. 28, 1950 |
| 405,050 | Roberts | Apr. 8, 1890 |
| 1,402,545 | Springborn | Jan. 3, 1922 |
| 2,038,299 | Kohlhagen | Apr. 21, 1936 |
| 2,151,833 | Bugatti | Mar. 28, 1939 |
| 2,366,541 | Malkin | Jan. 2, 1945 |
| 2,477,762 | Monroe | Aug. 2, 1949 |
| 2,550,536 | Delano, Jr. et al. | Apr. 24, 1951 |

FOREIGN PATENTS

| | | |
|---|---|---|
| 517,520 | Great Britain | Feb. 1, 1940 |